June 15, 1943.   J. W. McFARLANE ET AL   2,322,044
PHOTOGRAPHIC ESTIMATING AND CALCULATING DEVICE
Filed Aug. 15, 1941
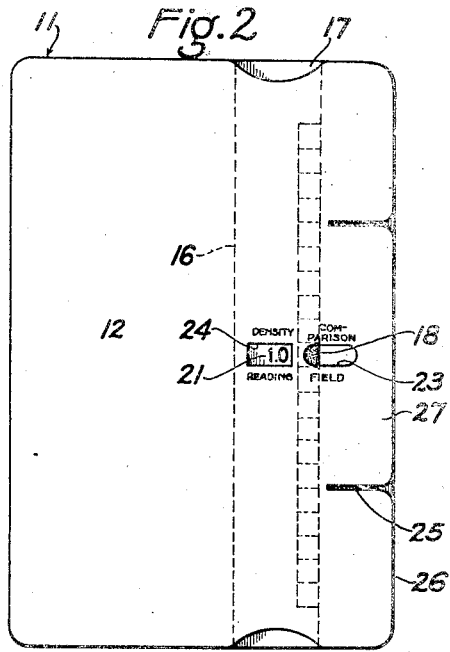
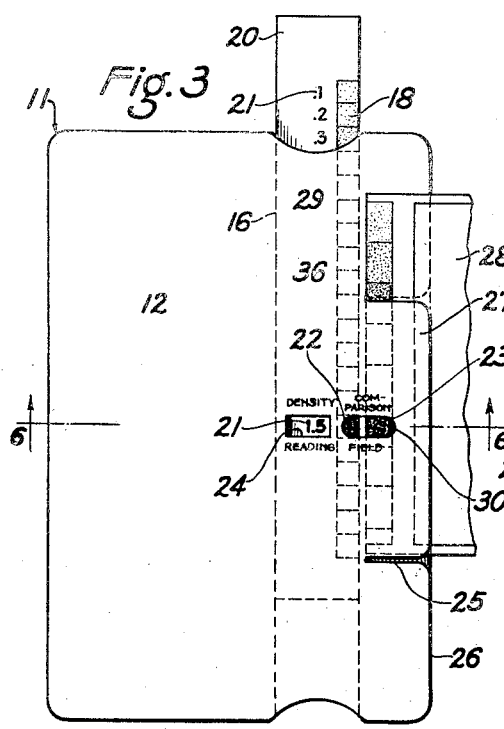
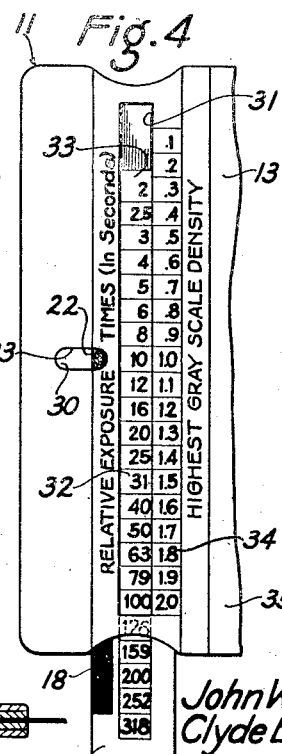
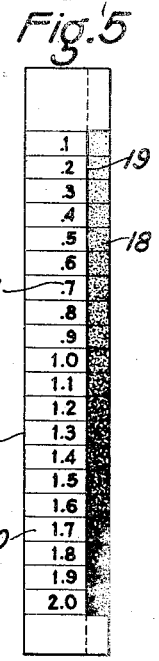
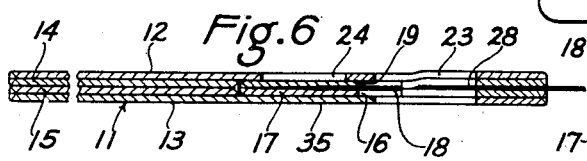
John W. McFarlane
Clyde Everett Moses
INVENTORS
BY
ATTORNEYS Patented June 15, 1943

2,322,044

UNITED STATES PATENT OFFICE 2,322,044

PHOTOGRAPHIC ESTIMATING AND CALCULATING DEVICE

John W. McFarlane and Clyde Everett Moses, Rochester, N. Y., assignors to Eastman Kodak Company, Rochester, N. Y., a corporation of New Jersey Application August 15, 1941, Serial No. 407,092

5 Claims. (Cl. 88—14)

The present invention relates to photography, and more particularly to a device for estimating gray scale densities from suitably prepared negatives, such for example, as color-separation negatives.

One object of the invention is the provision of a device of this type which makes possible the estimating of the gray scale densities of negatives, and the use of these densities (a) in the control of processing conditions, (b) to indicate approximate printing times in color printing, and (c) to indicate the balance of color-separation negatives.

A still further object of the invention is the provision of such a device which is simple in construction, easy to manipulate, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a face or front view of a negative provided with a gray scale, the density steps of which are to be measured or estimated;

Fig. 2 is a front view of the measuring or estimating device of the present invention, showing the position of the matching density scale and the density values associated therewith;

Fig. 3 is a view similar to Fig. 2, but with the negative in position in the device, showing the relation of the negative gray scale and the matching density scale by which the gray scale densities may be estimated;

Fig. 4 is a partial view of the device illustrated in Fig. 2, but taken from the opposite face thereof, this view being termed the rear view of the device, showing a slide calculator for estimating relative exposure times of the different negatives;

Fig. 5 is a front view of the sliding member removed from the device, showing the relation of the matching density scale and the density values associated therewith; and Fig. 6 is a transverse sectional view through the device shown in Fig. 3 and taken substantially on line 6—6 thereof, showing the relation of the parts.

The present invention relates to a simple and inexpensive device by which the density readings of suitably prepared negatives such, for example, as color separation negatives may be easily and readily estimated. This device is not intended for precise densitometric control, but merely for approximate estimations. If such precise control is desirable, a suitable densitometer or similar instrument should be used. However, as is well known in the art, gray scale density readings may be used to control processing conditions, to indicate approximate printing times in color printing, and to indicate the balance of color-separation negatives. It is also well known that with approximately uniform exposures the density range of a gray scale indicates the degree of development.

In the preparation of negatives for the "Eastman wash-off relief process," or for certain other processes of color printing, three separate negatives are formed, one negative being exposed through a red filter, the second negative being exposed through a green filter, and the third negative being exposed through a blue filter, and designated as red-, green-, and blue-filter negatives respectively. Appropriate filter factors are, of course, used in making these three exposures, as is well known. In order to afford a check on exposures and development of the three negatives, a gray scale is incorporated in the subject being photographed so that an image of this gray scale will appear in each negative, one of such negatives being illustrated in Fig. 1. As the formation of these negatives is well known in the art and does not constitute a part of the present invention, further description is not deemed necessary. Suffice it to say that three separate negatives are formed, each negative being exposed through an appropriate color filter and having incorporated therein an image of the gray scale.

Color separation negatives which are ideally balanced have equal densities in corresponding steps of the gray scale in all three negatives. The density range of all the negatives would then, of course, be equal, this density range being the difference in the density readings between the high and low steps of the gray scale, as is well known. This ideal condition, however, is not usually secured in practice, so that the density ranges of the three gray scales are not equal. However, if the density ranges of the three gray scales are relatively close, the negatives may be used for making the necessary color-separation positives. Obviously, any variation in the densities of the three gray scales will necessitate a correction in the printing time of the positives. It is necessary, therefore, to first measure the highest and lowest density steps of each negative gray scale so that any variation in density scale may be ascertained, after which, the correct printing time may be calculated, as will be later described. These gray scale density readings may, of course, be accurately measured by a suitable densitometer or other similar instrument. However, for amateur use, sufficiently good results can be secured by estimating these various gray scale readings in the manner to be later described. To this end, the present invention provides a simple, inexpensive, and highly effective device by which the various gray scale readings may be estimated.

This device comprises, in the present embodiment, a flat, card-like member, generally indicated by the numeral 11, formed from a single strip of lightweight cardboard, or other suitable material, and folded, as shown in Fig. 6, to provide a four layer structure having a frontpiece 12, a backpiece 13, and two intermediate or spacing pieces 14 and 15. The various pieces or layers may be held in their assembled relation by adhesive or other suitable fastening means. The terms "front" and "back" pieces are, of course, merely relative, as either side of the device may be considered as the front, as is apparent. A transverse channel 16 is formed in the two spacing layers 14 and 15 to slidably receive a member 17 formed of two thicknesses of cardboard, as shown in Fig. 6, between which is mounted a density scale 18 which projects laterally from the side 19 of the member 17 as best shown in Fig. 5. The front face or side 20 of the member 17 has printed thereon a series of density values 21 corresponding to and in alignment with the various steps in the density scale 18, as is apparent from inspection of Fig. 5.

The member 17 is slidable in the channel 16 to selectably position any one of the various steps of the density scale 18 in registry with a portion 22 of an elongated slot 23 which extends through the device 11, as shown in Fig. 6, the portion 22 communicating with the channel 16 so that the steps of the density scale 18 may be viewable there through, as shown in Fig. 2 and Fig. 3. When any step of the density scale 18 is moved into register with the slot portion 22, the corresponding density value 21 is simultaneously moved into registry with and is viewable through an opening 24 formed in the frontpiece 12 as clearly illustrated in Figs. 2 and 3. By means of this simple arrangement, the density of the step of the scale 18, which is in registry with the slot portion 22, may be quickly and easily ascertained by viewing the density value through the opening 24.

The front piece 12 and the spacing piece 15 are formed with spaced slits 25 which extend inwardly from the edge 26 of the device 11, see Figs. 2 and 3, to form a flap 27, behind which the negative 28 may be inserted to position a step of the gray scale 29 thereof in registry with the portion 30 of the slot 23 and in substantial abutting relation with the density scale 18, all as clearly shown in Fig. 3. The slot 23 is of a width sufficient to frame, in registering relation, only a single step of the density scale 18 and a single step of the gray scale 29, the purpose of which will be later more fully described. The back piece 13 is provided with a long, narrow opening 31 which exposes a relative-exposure-time scale 32 formed on the rear face 33 of the member 17, shown in Fig. 5. This scale 32 is adapted to cooperate with stationary density values 34 formed on the outer surface 35 of the back 13 adjacent the edge of the opening 31, as shown in Fig. 4. These scales cooperate to indicate the relative printing times of the various negatives, as will be later described.

In the use of the above-described device, the negative 28 is first trimmed so that the gray scale 29 appears along one edge 36 thereof, as illustrated in Fig. 1. This trimmed edge 36 of the gray scale 29 is inserted behind the flap 27 and moved into abutting relation with the density scale 18, as shown in Fig. 3. The gray scale 29 of the negative 28 is then moved to bring a pre-selected density step thereof, usually the highest, into registry with the portion 30 of the slot 23. The device 11 is then held before a source of bright, diffused light, and the member 17 is slid along the channel 16 to bring a matching portion or step of the density scale 18 into registry with the preselected step of the gray scale 29. When the steps of the two scales 18 and 29 are visually matched, the density of the matched steps is then read by noting the numeral or density value 21 appearing in the opening 24. The slot 23 may thus be considered as a "comparison field" in which an unknown density step of the gray scale 29 is matched or compared with a known density step of the density scale 18. After the highest step of the gray scale 29 is thus matched or compared and the density value thereof noted, the negative 28 is then moved to bring another density step of the gray scale 29, preferably the lowest, into registry with the portion 30 of the slot 23. The member 17 is now moved to again bring a matching portion of the density scale 18 into matching relation with the second or lowest step of the gray scale 29, and the corresponding density value noted in the opening 24. Each negative is thus measured to estimate the densities of the high and low steps of the gray scale 29 thereof, the difference in the density values of these two steps being the measure of the density range of the gray scale of the particular negative. These readings are then utilized to estimate the relative printing times required, as will be later pointed out. A single example illustrates the procedure, the readings of the negatives exposed through the red, green, and blue filters, being designated as R, G, and B, respectively.

|  | R | G | B |
|---|---|---|---|
| High density value | 1.5 | 1.6 | 1.55 |
| Low density value | 0.2 | 0.25 | 0.3 |
| Density range | 1.3 | 1.35 | 1.25 |
| Approximate printing time required seconds | 30 | 40 | 35 |

As the readings of the three negatives vary slightly, obviously different printing times will be required. In order to determine the relative printing time, one of the negatives, say the R negative, is given 30 seconds exposure which is found to be correct either by trial or experience. This exposure time can then be utilized to estimate the exposure times for the other two negatives. To secure this result, the device 11 is turned over to bring into view the scales shown in Fig. 4. The member 17 is then slid along the channel 16 to bring the numeral 30, exposure time in seconds for the R negative, on exposure-time-scale 32 opposite numeral 1.5 on the stationary scale 34, the numeral 1.5 representing the density value for the high step on the gray scale of the R negative. Now opposite numeral 1.6 on the scale 34, an exposure time of 40 seconds is noted on the scale 32. Thus the G negative with a high density value of 1.6 will require an exposure of 40 seconds. Accordingly the high density value of 1.55 for the B negative will require a printing time of approximately 35 seconds, as shown on the scale 32.

By means of this simple device, the densities of the highest and lowest steps, or any other preselected steps, on the gray scales 29 of the R, G, and B negatives may be easily, quickly, and reliably estimated. These readings will not only indicate the difference in the density ranges of the three gray scales, but may also be utilized to estimate the relative printing times required. While the above described device has been described in connection with color separation negatives, this is by way of illustration only as it may also be used as a means of controlling the processing of black-and-white materials.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

We claim:

1. A device for estimating gray scale densities on a negative comprising, in combination, a body portion formed with a channel and an elongated slot extending through said body portion and having a section thereof communicating with said channel, a member slidably mounted in said channel and provided with a density scale mounted along one edge thereof and adapted to be moved across said body portion to bring different steps of said density scale into registry with said section to be viewable therethrough, means on said body portion adapted to support said negative so that only a single preselected step of the gray scale formed thereon is arranged in registry with said slot and in substantial abutting relation with said density scale, said member being slidable relative to said body portion to bring into registry with said section a step of said density scale which visually matches said preselected step, and a density value on said member corresponding to the matched step of said density scale being then visible through an aperture in said body portion to indicate the density of the matched step of said gray scale.

2. A device for estimating gray scale densities on a negative comprising, in combination, a body portion formed with a channel, a member slidably positioned in said channel and formed with a density scale arranged along one edge thereof, a flap on said body portion to position thereon a negative provided with a gray scale the density steps of which are to be measured, said body portion being formed with an elongated slot having a section communicating with said channel and a section extending into said flap so that a single density step of the density scale and a selected step of the gray scale may be brought into registry with and viewable in abutting relation through said slot, said member being slidable in said channel to bring into registry with said first slot section a single density step of the density scale which visually matches the selected step of the gray scale positioned in registry with the second slot section, and a density value on said member being then positioned in registry with an aperture in said body portion to indicate the density of the selected step of the gray scale.

3. A device for estimating gray scale densities on a negative comprising, in combination, a body portion adapted to support a negative provided with a gray scale certain density steps of which are to be measured, a density scale slidably mounted on said body portion and arranged in abutting relation with said gray scale, said body portion being formed with a slot which affords a small comparison field beneath which limited portions only of said gray and density scales may be arranged in abutting relation for visual comparison, said density scale being slidable on said body portion to bring into said field a portion of said density scale which visually matches a preselected portion of said gray scale, and a density value carried by the density scale and visible through an aperture in said body portion to indicate the density of the matched preselected step of the gray scale.

4. A device for estimating the approximate relative gray scale densities on color separation negatives and for calculating the relative exposure times of said negatives comprising, in combination, a body portion on which the negatives are mounted one at a time for examination, each negative being provided with a gray scale having a preselected density to be measured, a member slidably mounted on said body portion and provided with a density scale the steps of which may be brought into visual matching relation with a corresponding step of the gray scale, density values associated with the density scale to indicate the relative densities of the corresponding matched steps in the gray scale of each negative, and a slide type calculator for determining the relative exposure times of the different negatives, said calculator comprising a stationary scale on said body portion representing a gray scale density, and a relative-exposure-time-scale carried by said member and adjustable relative to said stationary scale to indicate the relative exposure times for the negatives in proportion to the density values of the corresponding steps of the different gray scales of the negatives.

5. A device for estimating the relative gray scale densities of color separation negatives and for calculating the relative exposure times for said negatives comprising, in combination, a body portion adapted to successively support said negatives each of which is provided with a gray scale, said body portion being provided with a channel in which a member is slidably mounted, a density scale secured to one edge of said member and positioned to substantially abut the gray scale of each negative when the latter is supported on said body portion, said body portion being formed with an opening adapted to frame only a single preselected step of each negative gray scale and a registering step of the density scale, the latter being movable to bring into registry with said opening a step which visually matches said preselected step, a density value carried by one face said member and visible through an aperture in said body portion to indicate the density of the preselected step of the gray scale being measured, the different density values representing the relative densities of the corresponding preselected steps of the negative gray scales, and an exposure-time calculator comprising a scale carried by the opposite face of said slidable member and cooperating with a stationary scale on said body representing the gray scale densities measured whereby the adjusting of the time scale to position a predetermined exposure time of one of the negatives opposite its preselected gray scale density reading on the stationary scale permits the exposure times for the other negatives to be read directly on the time scale opposite the preselected density values found for said other negatives.

JOHN W. McFARLANE.
CLYDE EVERETT MOSES.